(12) United States Patent
Chatterji et al.

(10) Patent No.: US 9,346,711 B2
(45) Date of Patent: May 24, 2016

(54) GEOPOLYMER CEMENT COMPOSITIONS AND METHODS OF USE

(75) Inventors: Jiten Chatterji, Duncan, OK (US); D. Chad. Brenneis, Marlow, OK (US); Crystal L. Keys, Indiahoma, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 64 days.

(21) Appl. No.: 13/587,397

(22) Filed: Aug. 16, 2012

(65) Prior Publication Data

US 2014/0048264 A1 Feb. 20, 2014

(51) Int. Cl.
*C04B 22/00* (2006.01)
*E21B 33/13* (2006.01)
*C09K 8/46* (2006.01)
*C04B 28/00* (2006.01)

(52) U.S. Cl.
CPC .............. *C04B 22/00* (2013.01); *C04B 28/006* (2013.01); *C09K 8/46* (2013.01); *E21B 33/13* (2013.01); *Y02P 40/165* (2015.11); *Y02W 30/92* (2015.05); *Y02W 30/94* (2015.05)

(58) Field of Classification Search
None
See application file for complete search history.

(56) References Cited

U.S. PATENT DOCUMENTS

| | | | |
|---|---|---|---|
| 4,515,635 A | 5/1985 | Rao et al. | |
| 4,555,269 A | 11/1985 | Rao et al. | |
| 4,676,317 A | 6/1987 | Fry et al. | |
| 4,687,516 A | 8/1987 | Burkhalter et al. | |
| 4,941,536 A | 7/1990 | Brothers et al. | |
| 5,004,506 A * | 4/1991 | Allen et al. | 106/729 |
| 5,049,288 A | 9/1991 | Brothers et al. | |
| 5,175,277 A * | 12/1992 | Rakitsky et al. | 536/114 |
| 5,472,051 A | 12/1995 | Brothers | |
| 5,536,311 A | 7/1996 | Rodrigues | |
| 5,588,498 A | 12/1996 | Kitada | |
| 5,788,762 A * | 8/1998 | Barger et al. | 106/706 |
| 6,068,055 A * | 5/2000 | Chatterji et al. | 166/293 |
| 6,869,473 B2 * | 3/2005 | Comrie | 106/697 |
| 7,141,112 B2 * | 11/2006 | Comrie | 106/697 |
| 7,294,193 B2 * | 11/2007 | Comrie | 106/707 |
| 7,612,021 B2 | 11/2009 | Chatterji et al. | |
| 7,631,692 B2 | 12/2009 | Roddy | |
| 7,743,828 B2 | 6/2010 | Roddy | |
| 7,789,150 B2 | 9/2010 | Roddy | |
| 7,794,537 B2 * | 9/2010 | Barlet-Gouedard et al. | 106/672 |
| 8,162,058 B1 | 4/2012 | Chatterji et al. | |
| 2002/0117086 A1 | 8/2002 | Shi et al. | |
| 2003/0188669 A1 * | 10/2003 | Sobolev et al. | 106/737 |
| 2005/0096207 A1 * | 5/2005 | Urbanek | 501/6 |
| 2005/0103235 A1 * | 5/2005 | Harrison | 106/801 |
| 2005/0133222 A1 * | 6/2005 | Di Lullo Arias et al. | 166/292 |
| 2006/0131019 A1 * | 6/2006 | Santra et al. | 166/292 |
| 2006/0288912 A1 | 12/2006 | Sun et al. | |
| 2008/0028994 A1 * | 2/2008 | Barlet-Gouedard et al. | 106/811 |
| 2008/0028995 A1 * | 2/2008 | Barlet-Gouedard et al. | 106/811 |
| 2009/0105099 A1 * | 4/2009 | Warrender et al. | 507/269 |
| 2009/0200029 A1 * | 8/2009 | Roddy et al. | 166/293 |
| 2010/0041792 A1 | 2/2010 | Roddy et al. | |
| 2010/0282466 A1 | 11/2010 | Brenneis et al. | |
| 2012/0145393 A1 | 6/2012 | Roddy et al. | |
| 2012/0152539 A1 | 6/2012 | Karcher et al. | |
| 2012/0193097 A1 | 8/2012 | Roddy et al. | |
| 2012/0325476 A1 * | 12/2012 | Brenneis et al. | 166/292 |

FOREIGN PATENT DOCUMENTS

| | | |
|---|---|---|
| GB | 23159 | 0/1898 |
| WO | 2005019130 A1 | 3/2005 |

OTHER PUBLICATIONS

Calcium Hydroxide MSDS; ScienceLab.com Chemicals and Laboratory Equipment; Oct. 2005; pp. 1-6.*
HES Brochure, "Halad®-9", Aug. 2007.
HES Brochure, "Halad®-23", Aug. 2007.
HES Brochure, "Halad®-344", Aug. 2007.
HES Brochure, "Halad®-413", Aug. 2007.
HES Brochure, "HR®-4 Cement Retarder", Aug. 2010.
HES Brochure, "HR®-5", Aug. 2007.
HES Brochure, "HR®-7", Aug. 2007.
HES Brochure, "HR®-12", Aug. 2007.
HES Brochure, "HR®-15", Aug. 2007.
HES Brochure, "HR®-25", Aug. 2007.
HES Brochure, "SCR-100™ Cement Retarder", Nov. 2010.
Hess Pumice Products, Inc., "Fact Sheet", Drilling/Cementing Services Products, located at www.hesspumice.com.
International Search Report and Written Opinion for Application No. PCT/US2013/055250 dated Nov. 27, 2013.
Database WPI Week 200830 Thomson Scientific, London, GB AN 2008-E42856 XP002755527 Dated Feb. 10, 2008.
Supplementary European Search Report for European Application No. EP 13 82 9773 dated Mar. 29, 2016.

* cited by examiner

*Primary Examiner* — Doug Hutton, Jr.
*Assistant Examiner* — Anuradha Ahuja
(74) *Attorney, Agent, or Firm* — Craig W. Roddy; Tumey LLP

(57) ABSTRACT

Methods and compositions for cementing operations that include pumice in geopolymer cement compositions comprising slag.

20 Claims, No Drawings

GEOPOLYMER CEMENT COMPOSITIONS AND METHODS OF USE

BACKGROUND

The present invention relates to cementing operations and, more particularly, in certain embodiments, to geopolymer cement compositions comprising slag and pumice and associated methods use in cementing operations.

In cementing operations, such as well construction and remedial cementing, cement compositions are commonly utilized. Cement compositions may be used in primary-cementing operations whereby pipe strings, such as casing and liners, are cemented well bores. In a typical primary-cementing operation, a cement composition may be pumped into an annulus between the walls of the well bore and the exterior surface of the pipe string disposed therein. The cement composition may set in the annular space, thereby forming an annular sheath of hardened, substantially impermeable material (e.g., a cement sheath) that may support and position the pipe string in the well bore and may bond the exterior surface of the pipe string to the well bore walls. Among other things, the cement sheath surrounding the pipe string should function to prevent the migration of fluids in the annulus, as well as protecting the pipe string from corrosion. Cement compositions also may be used in remedial cementing methods, such as in the placement of plugs, and in squeeze cementing for sealing voids in a pipe string, cement sheath, gravel pack, subterranean formation, and the like. Cement compositions also may be used in surface applications, for example, in surface applications.

A particular challenge in cementing operations is the development of satisfactory mechanical properties in a settable composition within a reasonable time period after placement in the subterranean formation. During the life of a well, the subterranean cement sheath undergoes numerous strains and stresses as a result of temperature effects, pressure effects, and impact effects. The ability to withstand these strains and stresses is directly related to the mechanical properties of the settable composition after setting. The mechanical properties are often characterized using parameters such as compressive strength, tensile strength. Young's Modulus, Poisson's Ratio, elasticity, and the like. These properties may be modified by the inclusion of additives.

One type of settable composition that has been used heretofore comprises slag cement, which is typically a blend of Portland cement and slag. Because Portland cement develops compressive strength much more rapidly than slag, the amount of slag is typically limited to no more than 40% by weight of the slag cement. Drawbacks to slag cement include the relatively high cost of the Portland cement as compared to the slag, which is a waste material. Drawbacks to using higher concentrations of slag may include the inability for the settable composition to develop adequate compressive strength in a reasonable time and ensure the long-term structural integrity of the cement.

Thus, there exists a need for cement compositions that comprise slag with enhanced mechanical features that develop adequate compressive strength for use in cementing operations.

SUMMARY

An embodiment discloses a method of cementing. The method of cementing may comprise providing a geopolymer cement composition. The geopolymer cement composition may comprise a cementitious component consisting essentially of slag and pumice, a hydroxyl source, and water. The method further may comprise allowing the geopolymer cement composition to set.

Another embodiment discloses a method of cementing. The method of cementing may comprise preparing a dry blend comprising lime and a cementitious component comprising slag and pumice. The method further may comprise combining the dry blend with water to form a geopolymer cement composition. The method further may comprise introducing the geopolymer cement composition into a subterranean formation. The method further may comprise allowing the geopolymer cement composition to set.

Another embodiment discloses a method of cementing. The method of cementing may comprise providing a geopolymer cement composition. The geopolymer cement composition may comprise a cementitious component consisting of slag in an amount in a range of from about 40% to about 60% by weight of the cementitious component and pumice in an amount in a range of from about 40% to about 60% by weight of the cementitious component, wherein the geopolymer cement composition is free of any additional cementitious component. The geopolymer cement composition further may comprise hydrated lime in an amount in a range of from about 0.1% to about 20% weight of the cementitious component, and water. The method further may comprise introducing the geopolymer cement composition into a well bore annulus in a subterranean formation during a primary cementing operation. The method further may comprise allowing the geopolymer cement composition to set, wherein inclusion of the pumice in the geopolymer cement composition increases the 24-hour compressive strength of the geopolymer cement composition at 180° F. in an amount of at least about 30% as compared to replacement of the pumice with additional slag.

Yet another embodiment discloses a geopolymer cement composition. The geopolymer cement composition may comprise a cementitious component consisting essentially of slag and pumice. The geopolymer cement composition further may comprise a hydroxyl source and water.

The features and advantages of the present invention will be readily apparent to those skilled in the art. While numerous changes may be made by those skilled in the art, such changes are within the spirit of the invention.

DESCRIPTION OF PREFERRED EMBODIMENTS

Embodiments of the present invention disclose geopolymer cement compositions comprising slag, pumice, a hydroxyl source, and water. One of the many potential advantages of embodiments of the geopolymer compositions is that including a mixture of slag and pumice may provide geopolymer cement compositions with adequate compressive strengths for use in subterranean applications despite the increased slag content. By way of example, the compressive strength of the geopolymer cement compositions containing the mixture of the slag and pumice may be increased by at least about 10% in one embodiment, and at least about 30% in another embodiment, as compared to the same geopolymer cement composition having the pumice replaced with additional slag. Accordingly, embodiments of the geopolymer cement compositions may be used in a variety of subterranean applications where cement compositions may be used, including, but not limited to, primary and remedial cementing.

In some embodiments, the geopolymer cement compositions may comprise slag. Slag is generally a by-product in the production of various metals from their corresponding ores. By way of example, the production of cast iron can produce slag as a granulated, blast furnace by-product with the slag generally comprising the oxidized impurities round in iron ore. Slag may generally be considered to have cementitious properties, in that it may set and harden in the presence of a hydroxyl source and water. The slag may be included in embodiments of the geopolymer cement compositions in an amount suitable for a particular application. In some embodiments, the slag may be present in an amount in a range of from about 40% to about 100% by weight of cementitious components ("bwoc"), for example, about 40%, about 50%, about 60%, about 70%, about 80%, about 90%, or about 100%. Cementitious components include those components or combinations of components of the geopolymer cement compositions that hydraulically set, or otherwise harden, to develop compressive strength, including, for example, slag, fly ash, hydraulic cement, and the like. In certain embodiments, the slag may be present in an amount greater than about 40% bwoc, greater than about 50% bwoc, greater than about 60% bwoc, greater than about 70% bwoc, greater than about 80% bwoc, or greater than about 90% bwoc.

In some embodiments, the geopolymer cement compositions may comprise pumice. Generally, pumice is a volcanic rock that exhibits cementitious properties, in that it may set and harden in the presence of a hydroxyl source and water. The hydroxyl source may be used in combination with the pumice, for example, to provide sufficient calcium ions for the pumice to set. An example of a suitable pumice is available from Hess Pumice Products, Inc., Malad City, Id., under the tradename DS-200 having an average particle size of less than 20 microns. In some embodiments, the pumice may be present in geopolymer cement compositions of the present invention in an amount in the range of about 0.1% to about 60% bwoc. In some embodiments, the pumice may be present in an amount ranging between any of and/or including any of about 0.1%, about 5%, about 10%, about 20%, about 30%, about 40%, about 50%, or about 60%. In some embodiments, a total amount of cementitious components in the geopolymer cement composition may consist essentially of and/or consist of the slag, the pumice, and the hydroxyl source. One of ordinary skill in the art, with the benefit of this disclosure, will recognize the appropriate amount of the pumice to include for a chosen application.

In some embodiments, the geopolymer cement compositions may comprise a hydroxyl source. The hydroxyl source may be included in the geopolymer cement compositions to provide hydroxyl groups for activation of the slag and/or pumice, thus providing a cement composition that will react with the water to form a hardened mass in accordance with embodiments of the present invention. Any of a variety of suitable hydroxyl sources may be used that are capable of generating hydroxyl groups (OH$^-$) when dissolved in the water. Examples of suitable hydroxyl sources include basic materials, such as sodium hydroxide, sodium bicarbonate, sodium carbonate, lime (e.g., hydrated lime), and any combination thereof. In some embodiments, the hydroxyl source may be present in the geopolymer cement compositions in an amount in the range of from about 0.1% to about 25% bwoc. In further embodiments, the hydroxyl source may be included in an amount in the range of from about 1% to about 10% bwoc.

In some embodiments, the geopolymer cement compositions may be essentially free of any additional cementitious materials, such as hydraulic, cements, including, but not limited to, those comprising calcium, aluminum, silicon, oxygen, iron, and/or sulfur, which set and harden by reaction with water. Specific examples of hydraulic cements include, but are not limited to, Portland cements, pozzolana cements, gypsum cements, high alumina content cements, silica cements, and any combination thereof in some embodiments, the Portland cements are classified as Classes A, C, H, or G cements according to American Petroleum Institute, *API Specification for Materials and Testing for Well Cements*, API Specification 10, Fifth Ed., Jul. 1, 1990. In addition, in some embodiments, the hydraulic cement may include cements classified as ASTM Type I, II, or III. In some embodiments, the geopolymer cement compositions may comprise additional cementitious materials in an amount less than about 1% bwoc and, alternatively, less than about 0.1% bwoc. In one particular embodiment, the geopolymer cement may be free of any additional cementitious materials.

The water used in embodiments of the geopolymer cement compositions of the present invention may include, for example, freshwater, saltwater (e.g., water containing one or more salts dissolved therein), brine (e.g., saturated saltwater produced from subterranean formations), seawater, or any combination thereof. Generally, the water may be from any source, provided, for example, that it does not contain an excess of compounds that may undesirably affect other components in the geopolymer cement composition. In some embodiments, the water may be included in an amount sufficient to form a pumpable slurry. In some embodiments, the water may be included in the geopolymer cement compositions of the present invention in an amount in a range of from about 40% to about 200% bwoc. In some embodiments, the water may be included in an amount in a range of from about 40% to about 150% bwoc.

In some embodiments, the geopolymer cement compositions may further comprise a fluid-loss-control additive. As used herein, the term "fluid-loss-control additive" refers to an additive that is used to decrease the volume of fluid that is lost to the subterranean formation. Examples of suitable fluid-loss-control additives include, but not limited to, certain polymers, such as hydroxyethyl cellulose, carboxymethylhydroxyethyl cellulose, copolymers of 2-acrylamido-2-methylpropanesulfonic acid and acrylamide or N,N dimethylacrylamide, and graft copolymers comprising a backbone of lignin or lignite and pendant groups comprising at least one member selected from the group consisting of 2-acrylamido-2-methylpropanesulfonic acid, acrylonitrile, and N,N-dimethylacrylamide. Suitable fluid-loss-control additives are available from Halliburton Energy Services, Inc., under the tradenames HALAD™-9 fluid-loss additive, HALAD™-23 fluid-loss additive, HALAD™-344 fluid-loss additive, and HALAD™-413 fluid-loss additive. In some embodiments, the fluid-loss-control additive may be present in the geopolymer cement compositions in an amount in the range of from about 0.1% to about 5% bwoc.

In some embodiments, the geopolymer cement compositions may further comprise set retarder. As used herein, the term "set retarder" refers to an additive that is used to increase the thickening time of cement compositions. Examples of suitable set retarders include, but are not limited to, ammonium, alkali metals, alkaline earth metals, metal salts of sulfoalkylated lignins, hydroxycarboxy acids, copolymers of 2-acrylamido-2-methylpropane sulfonic acid salt and acrylic acid or maleic acid, and combinations thereof. One example of a suitable sulfoalkylated lignin comprises a sulfomethylated lignin. Suitable set retarding additives are available from Halliburton Energy Services, Inc. under the tradenames HR®-4 cement retarder, HR®-5 cement retarder, HR®-7 cement retarder, HR®-12 cement retarder, HR®-15 cement retarder, HR®-25 cement retarder, SCR™-100 cement retarder, and SCR™-500 cement retarder. Generally, where used, the set retarder may be included in the geopolymer cement compositions of the present invention in an amount sufficient to provide the desired set retardation. In some embodiments, the set retarder may be present in the geopolymer cement compositions in an amount in the range of from about 0.1% to about 5% bwoc.

Other additives suitable for use in subterranean cementing operations may also be added to embodiments of the geopolymer cement compositions, in accordance with embodiments of the present invention. Examples of such additives include, but are not limited to, strength-retrogression additives, set accelerators, weighting agents, lightweight additives, gas-generating additives, mechanical-property-enhancing additives, lost-circulation materials, filtration-control additives, foaming additives, thixotropic additives, and any combination thereof. Specific examples of these, and other, additives include crystalline silica, amorphous silica, fumed silica, salts, fibers, hydratable clays, calcined shale, vitrified shale, microspheres, fly ash, diatomaceous earth, metakaolin, ground perlite, rice husk ash, natural pozzolan, zeolite, cement kiln dust, resins, any combination thereof, and the like. A person having ordinary skill in the art, with the benefit of this disclosure, will readily be able to determine the type and amount of additive useful for a particular application and desired result.

Those of ordinary skill in the art will appreciate that embodiments of the geopolymer compositions generally should have a density suitable for a particular application. By way of example, embodiments of the geopolymer cement compositions may have a density of about 12 pounds per gallon ("lb/gal") to about 20 lb/gal. In certain embodiments, the geopolymer cement compositions may have a density of about 14 lb/gal to about 17 lb/gal. Those of ordinary skill in the art, with the benefit of this disclosure, will recognize the appropriate density for a particular application.

In some embodiments, the geopolymer cement composition may have a thickening time of greater than about 1 hour, alternatively, greater than about 2 hours, alternatively greater than about 5 hours at 3,000 psi and temperatures in a range of from about 50° F. to about 400° F., alternatively, in a range of from about 80° F. to about 250° F. and alternatively at a temperature of about 140° F. As used herein, the term "thickening time" refers to the time required for a cement composition to reach 70 Bearden units of Consistency "Bc") as measured on a high-temperature high-pressure consistometer in accordance with the procedure for determining cement thickening times set forth in API Recommended Practice 10B-2 (July 2005).

As previously mentioned, the compressive strength of the geopolymer cement compositions may be increased by using pumice in combination with slag. Indeed, it has been shown that using pumice in combination with slag can achieve higher compressive strength than use of either pumice or slag alone. As used herein, the term "compressive strength" refers to the destructive compressive strength measured in accordance with API Recommended Practice 10B-2 (July 2005) by physically testing the strength of the geopolymer cement composition after setting by crushing the sample in a compression-testing machine. The compressive strength is measured at a specified time after the composition has been mixed and the composition is maintained under specified temperature and pressure conditions. The compressive strength is calculated from the failure load divided by the cross-sectional area resisting the load and is reported in units of pound-force per square inch ("psi"). By way of example, the compressive strength of the geopolymer cement compositions containing the mixture of the slag and pumice may be increased by at least about 10% in one embodiment and at least about 30% in another embodiment, as compared to the same geopolymer cement composition having the pumice replaced with additional slag. In some embodiments, the geopolymer cement composition may have a 24-hour compressive strength in a range of from about 250 psi to about 20,000 psi and, alternatively, from about 350 psi about 3,000 psi at atmospheric pressure and temperatures in a range of from about 50° F. to about 400° F., alternatively, in a range of from about 80° F. to about 250° F., and alternatively at a temperature of about 180° F.

The components of the geopolymer cement compositions comprising slag, pumice, a hydroxyl source, and water may be combined in any order desired to form a geopolymer cement composition that can be placed into a subterranean formation. In addition, the components of the geopolymer cement compositions may be combined using any mixing device compatible with the composition, including a bulk mixer, for example. In some embodiments, a dry blend may first be formed by dry blending dry components comprising slag, pumice, and a hydroxyl source. The dry blend may then be combined with water to form the geopolymer cement composition. Other suitable techniques may be used for preparation of the geopolymer cement compositions as will be appreciated by those of ordinary skill in the art in accordance with embodiments of the present invention.

As will be appreciated by those of ordinary skill in the art, embodiments of the geopolymer cement compositions of the present invention may be used in a variety of cementing operations, including surface and subterranean operations, such as primary and remedial cementing. In some embodiments, a geopolymer cement composition may be provided that comprises slag, pumice, lime, and water, and allowed set. In certain embodiments, the geopolymer cement composition may be introduced into a subterranean formation and allowed to set therein. As used herein, introducing the cement composition into a subterranean formation includes introduction into any portion of the subterranean formation, including, without limitation, into a well bore drilled into the subterranean formation, into a near well bore region surrounding the well bore, or into both.

In primary-cementing embodiments, for example, embodiments of the geopolymer cement composition may be introduced into a well-bore annulus such as a space between a wall of a well bore and a conduit (e.g., pipe strings, liners) located in the well bore, the well bore penetrating the subterranean formation. The geopolymer cement composition may be allowed to set to form an annular sheath of hardened cement in the well-bore annulus. Among other things, the hardened cement formed by the set geopolymer cement composition may form a barrier, preventing the migration of fluids in the well bore. The hardened cement also may, for example, support the conduit in the well bore and/or form a bond between the well-bore wall and the conduit.

In remedial-cementing embodiments, a geopolymer cement composition may be used, for example, in squeeze-cementing operations or in the placement of cement plugs. By way of example, the geopolymer cement composition may be placed in a well bore to plug an opening, such as a void or crack, in the formation, in a gravel pack, in the conduit, in the cement sheath, and/or a microannulus between the cement sheath and the conduit or formation.

EXAMPLES

To facilitate a better understanding of the present invention, the following examples of some of the preferred embodiments are given. In no way should such examples be read to limit, or to define, the scope of the invention.

Example 1

The following series of tests was performed to evaluate the mechanical properties of geopolymer cement compositions. Five different geopolymer cement compositions, designated Samples 1-5, were prepared using the indicated amounts of water, slag, pumice, and lime. The amounts of these components are indicated in the table below with percent indicating the amount of the component by weight of the slag and pumice and gallon per sack ("gal/sk") indicating the gallons of the respective component per 94-pound sack of slag and pumice. It should be noted that Sample 5 was too thick and had to be hand mixed. The slag used was from LaFarge, Grand Chain, Ill. The lime used was hydrated lime from Texas Lime Company, Cleburne, Tex. The pumice used was DS-200 from Hess Pumice Products, Inc.

After preparation, the sample geopolymer cement compositions were allowed to cure for 24 hours in a 2"×4" metal cylinder that was placed in a water bath at 180° F. to form set cement cylinders. Immediately after removal from the water bath, destructive compressive strengths were determined using a mechanical press in accordance with API RP 10B-2. The results are set forth in the table below.

TABLE 1

| Sample | Density (lb/gal) | Ingredients | | | | Temp. (° F.) | 24 Hr Comp. Strength (psi) |
| | | Water (gal/sk) | Slag (%) | Pumice (%) | Lime (%) | | |
|---|---|---|---|---|---|---|---|
| 1 | 14.2 | 7.05 | 100 | — | 10 | 180 | 314 |
| 2 | 14.2 | 6.85 | 90 | 10 | 10 | 180 | 359 |
| 3 | 14.2 | 6.55 | 75 | 25 | 10 | 180 | 339 |
| 4 | 14.2 | 6.05 | 50 | 50 | 10 | 180 | 422 |
| 5 | 14.2 | 5.05 | — | 100 | 10 | 180 | 380 |

Based on the results of these tests, inclusion of pumice in the sample geopolymer cement compositions had a significant impact on compressive strength development. For example, increases in compressive strength of at least about 5% (Sample 2) and up to least about 30% (Sample 4) were obtained by replacing at least a portion of the pumice with slag. As illustrated by the comparison of Samples 4 and 5, the combination of pumice and slag appears to have a synergistic effect as Sample 4 with 50% slag and 50% pumice had a higher compressive strength than Sample 1 with 100% slag or Sample 2 with 100% pumice.

Example 2

The following series of tests was performed to evaluate the thickening-time response of including set retarders in geopolymer cement compositions. Three different geopolymer cement compositions, designated Samples 6-8, were prepared using the indicated amounts of water, slag, pumice, lime, a set retarder, and a fluid-loss-control additive. The amounts of these components are indicated in the table below with percent indicating the amount of the component by weight of the slag and pumice and gall on per sack ("gal/sk" indicating the gallons of the respective component per 94-pound sack of slag and pumice. The slag used was from LaFarge, Grand Chain, Ill. The lime used was hydrated lime from Texas Lime Company, Cleburne, Tex. The pumice used was DS-200 from Hess Pumice Products, Inc., having an average particle size of less than 20 microns. The set retarder was HR®-12 cement retarder from Halliburton Energy Services, Inc. The fluid-loss-control additive was Halad™-413 from Halliburton Energy Services, Inc.

After preparation, the sample geopolymer cement compositions were tested to determine their thickening times at 140° F., which is the time required for the compositions to reach 70 Bearden units of consistency. The thickening-time tests were performed in accordance with API RP 10B-2. The results are set forth in the table below.

TABLE 2

| Sample | Density (lb/gal) | Ingredients | | | | | | Thick Time hr:min (70 bc) |
| | | Water (gal/sk) | Slag (%) | Pumice (%) | Lime (%) | Retarder (%) | FLCA (%) | |
|---|---|---|---|---|---|---|---|---|
| 6 | 14.2 | 6.05 | 50 | 50 | 10 | 0.25 | 0.3 | 2:42 |
| 7 | 14.2 | 6.05 | 50 | 50 | 10 | 0.4 | 0.3 | 5:02 |
| 8 | 14.2 | 6.05 | 50 | 50 | 10 | 0.6 | 0.3 | 9:10 |

As illustrated, suitable thickening times can be obtained using set retarders in the sample geopolymer cement compositions. For example, thickening times in excess of 9 hours were obtained for Sample 8.

Example 3

The following series of tests was performed to evaluate the fluid loss of geopolymer cement compositions. Three different geopolymer cement compositions, designated Samples 9-11, were prepared using the indicated amounts of water, slag, pumice, lime, a set retarder, and a fluid-loss-control additive. The amounts of these components are indicated in the table below with percent indicating the amount of the component by weight of the slag and pumice and gallon per sack ("gal/sk") indicating the gallons of the respective component per 94-pound sack of slag and pumice. The slag used was from LaFarge, Grand Chain, Ill. The lime used was hydrated lime from Texas Lime Company, Cleburne, Tex. The pumice used was DS-200 from Hess Pumice Products, Inc., having an average particle size of less than 20 microns. The set retarder was HR®-12 cement retarder from Halliburton Energy Services, Inc. The fluid-loss-control additive was Halad™-413 from Halliburton Energy Services, Inc.

After preparation, the geopolymer cement compositions were poured into a pre-heated cell with a 325-mesh screen and a fluid-loss test was performed for 30 minutes at 1,000 psi at 190° F. in accordance with API RP 10B-2.

TABLE 3

| Sample | Density (lb/gal) | Ingredients | | | | | | API Fluid Loss (cc/30 min) |
| | | Water (gal/sk) | Slag (%) | Pumice (%) | Lime (%) | Retarder (%) | FLCA (%) | |
|---|---|---|---|---|---|---|---|---|
| 9 | 14.2 | 6.05 | 50 | 50 | 10 | 0.4 | 0.3 | 929[1] |
| 10 | 14.2 | 6.05 | 50 | 50 | 10 | 0.4 | 0.75 | 60 |
| 11 | 14.2 | 6.05 | 50 | 50 | 10 | 0.4 | 1.0 | 54 |

[1]Calculated API Fluid Loss

As illustrated, suitable fluid-loss control can be obtained using fluid-loss-control additives in the sample geopolymer cement compositions. For example, API fluid loss of less than or equal to 60 (cc/30 min were obtained for Samples 10 and 11.

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Although individual embodiments are discussed, the invention covers all combinations of all those embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present invention. If there is any conflict in the usages of a word or term in this specification and one or more patent(s) or other documents that may be incorporated herein by reference, the definitions that are consistent with this specification should be adopted.

What is claimed is:

1. A method of cementing comprising:
   providing a geopolymer cement composition consisting of:
      a cementitious component consisting essentially of slag and pumice;
      hydrated lime;
      an additive selected from the group consisting of crystalline silica, amorphous silica, fumed silica, a fiber, a hydratable clay, calcined shale, vitrified shale, a microsphere, diatomaceous earth, metakaolin, ground perlite, rice husk ash, zeolite, a resin, a dispersant, a defoaming agent, a set retarder, a weighting agent, a lightweight additive, a gas-generating additive, a lost-circulation material, a filtration-control additive, a fluid-loss-control additive, a foaming additive, a thixotropic additive, and any combination thereof; and
      water; and
   allowing the geopolymer cement composition to set;
   wherein the geopolymer cement composition does not comprise a set accelerator.

2. The method of claim 1, wherein the geopolymer cement composition has a density of about 12 pounds per gallon to about 20 pounds per gallon.

3. The method of claim 1, wherein the slag is present in an amount in a range of from about 40% to about 100% by weight of the cementitious component.

4. The method of claim 1, wherein the pumice is present in an amount in a range of from about 0.1% to about 60% by weight of the cementitious component.

5. The method of claim 1, wherein the slag is present in an amount in a range of from about 40% to about 60% by weight of the cementitious component, and wherein the pumice is present in an amount in a range of from about 40% to about 60% by weight of the cementitious component.

6. The method of claim 1, wherein the cementitious component consists of the slag and the pumice.

7. The method of claim 6, wherein the geopolymer cement composition is free of any additional cementitious materials.

8. The method of claim 1, wherein the hydrated lime is present in an amount in a range of from about 0.1% to about 25% by weight of the cementitious component.

9. The method of claim 1, further comprising introducing the geopolymer cement composition into a subterranean formation.

10. The method of claim 9, wherein introducing the geopolymer cement composition into a subterranean formation comprises introducing the geopolymer cement composition into a well-bore annulus.

11. The method of claim 1, wherein the geopolymer cement composition is used in a primary cementing operation.

12. The method of claim 1, wherein inclusion of the pumice in the geopolymer cement composition increases the 24-hour compressive strength of the geopolymer cement composition at 180° F. in an amount of at least about 5% as compared to replacement of the pumice with additional slag.

13. A method of cementing comprising:
    preparing a geopolymer cement composition consisting of water, hydrated lime, an additive, and a cementitious component comprising slag and pumice, wherein the additive is selected from the group consisting of crystalline silica, amorphous silica, fumed silica, a fiber, a hydratable clay, calcined shale, vitrified shale, a microsphere, diatomaceous earth, metakaolin, ground perlite, rice husk ash, zeolite, a resin, a dispersant, a defoaming agent, a set retarder, a weighting agent, a lightweight additive, a gas-generating additive, a lost-circulation material, a filtration-control additive, a fluid-loss-control additive, a foaming additive, a thixotropic additive, and any combination thereof;
    introducing the geopolymer cement composition into a subterranean formation; and
    allowing the geopolymer cement composition to set;
    wherein the geopolymer cement composition does not comprise a set accelerator.

14. The method of claim 13, wherein the slag is present in an amount in a range of from about 40% to about 60% by weight of the cementitious component, and wherein the pumice is present in an amount in a range of from about 40% to about 60% by weight of the cementitious component.

15. The method of claim 13, wherein the cementitious component consists of the slag and the pumice.

16. The method of claim 15, wherein the geopolymer cement composition is free of any additional cementitious materials.

17. The method of claim 13, wherein the hydrated lime is present in an amount in a range of from about 0.1% to about 25% by weight of the cementitious component.

18. The method of claim 13, wherein introducing the geopolymer cement composition into a subterranean formation comprises introducing the geopolymer cement composition into a well-bore annulus.

19. The method of claim 13, wherein inclusion of the pumice in the geopolymer cement composition increases the 24-hour compressive strength of the geopolymer cement composition at 180° F. in an amount of at least about 5% as compared to replacement of the pumice with additional slag.

20. A method of cementing comprising:
   providing a geopolymer cement composition consisting of:
      a cementitious component consisting of slag in an amount in a range of from about 40% to about 60% by weight of the cementitious component and pumice in an amount in a range of from about 40% to about 60% by weight of the cementitious component, wherein the geopolymer cement composition is free of any additional cementitious component;
      hydrated lime in an amount in a range of from about 0.1% to about 20% by weight of the cementitious component;
      an additive selected from the group consisting of crystalline silica, amorphous silica, fumed silica, a fiber, a hydratable clay, calcined shale, vitrified shale, a microsphere, diatomaceous earth, metakaolin, ground perlite, rice husk ash, zeolite, a resin, a dispersant, a defoaming agent, a set retarder, a weighting agent, a lightweight additive, a gas-generating additive, a lost-circulation material, a filtration-control additive, a fluid-loss-control additive, a foaming additive, a thixotropic additive, and any combination thereof; and
      water;
   introducing the geopolymer cement composition into a well bore annulus in a subterranean formation during a primary cementing operation; and
   allowing the geopolymer cement composition to set, wherein inclusion of the pumice in the geopolymer cement composition increases the 24-hour compressive strength of the geopolymer cement composition at 180° F. in an amount of at least about 30% as compared to replacement of the pumice with additional slag; wherein the geopolymer cement composition does not comprise a set accelerator.

* * * * *